United States Patent Office.

WILLIAM BERNER, OF POTTSVILLE, PENNSYLVANIA.

Letters Patent No. 80,120, dated July 21, 1868.

---

IMPROVEMENT IN THE MANUFACTURE OF TILE FOR FLOORING, &c.

---

*The Schedule referred to in these Letters Patent and making part of the same.*

---

TO ALL WHOM IT MAY CONCERN:

Be it known that I, WILLIAM BERNER, of Pottsville, in the county of Schuylkill, and in the State of Pennsylvania, have invented certain new and useful Improvements in Process for Making Tile for Flooring; and do hereby declare that the following is a full, clear, and exact description thereof.

The nature of my invention is in the mode of making the tiles for flooring, so that when finished, the tiles form a mosaic inlaid of whatever device or design may be desired, the composition being fluid when cast, and afterwards burned, when the black portion will assume the hardness of iron, the colors being varied as circumstances may require.

The ingredients in the white composition are—
Two pounds calcined pebbles.
Two pounds alum-clay.
Four pounds white potter's clay.
One pound china-clay—

All ground or pulverized and thoroughly mixed, after which a sufficient quantity of water is added to bring it to the proper consistency for casting into moulds.

The ingredients in the black or colored composition are—
One and a half pound manganese.
Half pound calcined copper.
One pound red potter's clay—

All ground or pulverized and thoroughly mixed, after which add six pounds of the above white composition, and a sufficient quantity of water to bring it to the proper consistency for casting into moulds.

The above quantities are merely to show the relative proportion of the various ingredients, and the ingredients themselves may be varied to some extent so as to produce different colors.

To form the tiles several different moulds or forms are necessary, according to the device or design intended to be inlaid—one a mould or matrix to receive the composition, the others to place therein to prevent the composition from spreading further than desired. The first process is the placing of a proper form or mould in the matrix, which leaves a portion open; this is then filled with composition, and left in that position till it assumes the proper consistency, when the first form or mould is removed and another placed therein. The interval between the first composition and this second form or mould is then filled with the other composition; at the same time the centre of the tile is cast into another mould or matrix, and when both have assumed the necessary consistency, the centre part is placed in its proper position in the first matrix, when the space thus left open is filled with composition. When this last has assumed the proper consistency, the bottom part of the tile is placed to the tile, after which they are carefully dried, and then burned in cases the same as stone-ware in a potter-kiln. When thus burned, the black or colored portion thereof will assume the hardness of iron.

Having thus fully described my invention, what I claim as new, and desire to secure by Letters Patent, is—

1. The mosaic inlaying of the tile, of whatever color or design they may be, each of the different parts being cast into a mould or moulds at the proper time, so as to unite and form into a solid mass, substantially as and for the purposes above set forth.

2. The composition, both white and black, or whatever color may hereafter be given to it, one of which, when burned, partakes of the hardness of iron, substantially as and for the purposes above set forth.

In testimony that I claim the foregoing, I have hereunto set my hand, this 9th day of April, 1868.

WILLIAM BERNER.

Witnesses:
FREDERICK HAESELER,
G. G. SCHOLLENBERGER.